United States Patent
Lacasse et al.

(10) Patent No.: US 9,448,096 B2
(45) Date of Patent: Sep. 20, 2016

(54) MEASURING AND DISPENSING CAP WITH INTERNAL MEASURING CHAMBERS

(71) Applicants: Mark E. Lacasse, Bloomfield Hills, MI (US); Kenan Wollborg, Inkster, MI (US)

(72) Inventors: Mark E. Lacasse, Bloomfield Hills, MI (US); Kenan Wollborg, Inkster, MI (US)

(73) Assignee: Innovestor, LLC, Bloomfield Hills, MI (US)

( * ) Notice: Subject to any disclaimer, the term of this patent is extended or adjusted under 35 U.S.C. 154(b) by 59 days.

(21) Appl. No.: 14/525,444

(22) Filed: Oct. 28, 2014

(65) Prior Publication Data

US 2016/0116321 A1    Apr. 28, 2016

(51) Int. Cl.
*G01F 11/36*    (2006.01)
*G01F 15/06*    (2006.01)

(52) U.S. Cl.
CPC ............... *G01F 11/36* (2013.01); *G01F 15/06* (2013.01)

(58) Field of Classification Search
CPC ......... G01F 11/36; G01F 11/42; G01F 15/06
USPC ....................................... 222/443, 427, 430
See application file for complete search history.

(56) References Cited

U.S. PATENT DOCUMENTS

| | | |
|---|---|---|
| 1,944,447 A | 1/1934 | McVicker |
| 2,877,937 A | 3/1959 | Weir |
| 2,898,010 A | 8/1959 | Tepper |
| 3,130,874 A | 4/1964 | Bulmer |
| 3,269,612 A | 8/1966 | Bode |
| 3,308,995 A * | 3/1967 | Lee ........................ A47G 19/34 222/427 |
| 3,402,847 A | 9/1968 | Bridenstine |
| 3,450,310 A | 6/1969 | Dayton |
| 3,695,487 A | 10/1972 | Slayton et al. |
| 3,893,592 A | 7/1975 | Friedman |
| 4,164,301 A | 8/1979 | Thayer |
| 4,174,058 A | 11/1979 | Bassignani |
| 4,232,718 A | 11/1980 | Wippermann |
| 4,345,700 A | 8/1982 | Souza |
| 4,572,376 A | 2/1986 | Wrennall |
| 4,674,660 A | 6/1987 | Botto |
| 4,832,235 A | 5/1989 | Palmer |
| 4,961,521 A | 10/1990 | Eckman |

(Continued)

FOREIGN PATENT DOCUMENTS

| | | |
|---|---|---|
| CA | 2391665 A1 | 12/2003 |
| DE | 102009043193 A1 | 4/2010 |
| WO | 9714632 A1 | 4/1997 |

*Primary Examiner* — Donnell Long
(74) *Attorney, Agent, or Firm* — Hemholdt Law PLC; Thomas D. Helmholdt

(57) ABSTRACT

In an apparatus for measuring and dispensing pourable material, a removable cap includes a body, a cylindrical sleeve member sheathing an outer circumference of the body, and a biasing spring engageable between the body and the cylindrical sleeve member for biasing the cylindrical sleeve member toward a predetermined home position. The body can include chambers separated longitudinally from one another by a radial panel defining an arcuate aperture allowing passage of the pourable material between the chambers. The cylindrical sleeve member is rotatable with respect to the body for aligning at least one of a plurality of measuring compartments defined by the cylindrical sleeve member with the arcuate aperture for allowing pourable material flow therethrough. The biasing spring can close access to the plurality of measuring compartments during dispensing of a predetermined amount of the pourable material.

19 Claims, 2 Drawing Sheets

(56) References Cited

U.S. PATENT DOCUMENTS

| | | |
|---|---|---|
| 5,123,574 A | 6/1992 | Poulos |
| 5,186,366 A | 2/1993 | Meisner et al. |
| 5,271,535 A | 12/1993 | Fridman et al. |
| 5,495,962 A | 3/1996 | Nomura |
| 5,509,582 A | 4/1996 | Robbins, III |
| 5,520,307 A | 5/1996 | Miller et al. |
| 5,601,213 A | 2/1997 | Daniello |
| 5,839,619 A | 11/1998 | Willer |
| 5,890,627 A | 4/1999 | Storey |
| 6,283,339 B1 | 9/2001 | Morrow |
| 6,422,426 B1 | 7/2002 | Robbins, III et al. |
| 6,550,640 B2 | 4/2003 | Smith |
| 6,601,734 B1 | 8/2003 | Smith |
| 6,928,870 B1 | 8/2005 | Liebowitz |
| 6,948,641 B1 | 9/2005 | Williams |
| 7,451,901 B2 | 11/2008 | Ranney |
| 7,748,579 B1 | 7/2010 | Shin |
| 7,950,550 B2 | 5/2011 | Webster et al. |
| 7,959,031 B2 | 6/2011 | Ranney |
| 8,517,288 B2 | 8/2013 | Pitzer et al. |
| 8,720,748 B2 | 5/2014 | Groubert et al. |
| 8,833,614 B2 | 9/2014 | Webster et al. |
| 8,925,768 B1 | 1/2015 | Ismail |

\* cited by examiner

MEASURING AND DISPENSING CAP WITH INTERNAL MEASURING CHAMBERS

FIELD OF THE INVENTION

The present invention relates generally to dispensing container and, more specifically, to dispensing cap constructions enabling a predetermined amount of contents of the container to be measured and dispensed from the cap.

BACKGROUND

Various measuring and dispensing container configurations are known in the art as can be seen from U.S. Pat. Nos. 8,720,748; 7,748,579; 7,451,901; 6,948,641; 6,422,426; 5,890,627; 5,839,619; and 5,509,582. While the measuring and dispensing containers are suitable for their intended use, it would be desirable to provide a measuring and dispensing cap that could be readily placed on different containers having different contents in order to reduce the cost and complexity of manufacturing and assembling a container having measuring and dispensing capability. Additionally, it would be desirable to provide a measuring and dispensing container capable of measuring and dispensing the container contents when the container is in an inverted position. It would also be desirable to provide a measuring container having a return function allowing the container to automatically return to a normal mode of operation after measuring and dispensing the measured contents.

SUMMARY

An apparatus for measuring and dispensing pourable material can have a removable cap. The cap can include a body having a cylindrical sidewall defining a primary axis and a first chamber and a second chamber separated longitudinally from one another by a radial panel extending transversely with respect to the primary axis. The radial panel can define an arcuate aperture allowing passage of the pourable material from the first chamber to the second chamber. The cap can include a cylindrical sleeve member located coaxial with respect to the primary axis and sheathing an outer circumference of the cylindrical sidewall of the body. The cylindrical sleeve member can define a plurality of measuring compartments defined by arcuate pie-shaped dispensing chambers received within the second chamber of the cylindrical sidewall of the body and can be rotatable with respect to the cylindrical sidewall of the body for aligning at least one the plurality of measuring compartments with the arcuate aperture of the body for allowing pourable material flow through the arcuate aperture for measuring a predetermined measured amount of the pourable material within measuring compartments aligned in fluid communication with the arcuate aperture. The cap can further include a biasing spring engageable between a portion of the body and a portion of the sleeve member for biasing the cylindrical sleeve member toward a predetermined home position with respect to the cylindrical sidewall of the body with the radial panel closing access to the plurality of measuring compartments during dispensing of the predetermined measured amount of the pourable material.

A measuring and dispensing container can include a receptacle for receiving an amount of pourable material, a body having a cylindrical sidewall defining a primary axis with an end attachable to the receptacle, a cylindrical sleeve member located coaxial with respect to the primary axis and sheathing an outer circumference of the cylindrical sidewall of the body, and a biasing spring engageable between a portion of the body and a portion of the sleeve member. The cylindrical sidewall of the body can define a primary axis, and a first chamber and a second chamber separated longitudinally from one another by a radial panel extending transversely with respect to the primary axis. The radial panel can define an arcuate aperture allowing passage of the pourable material from the first chamber to the second chamber. The body can include a plurality of grooves formed on an external surface of the cylindrical sidewall. The cylindrical sleeve member can define a plurality of measuring compartments defined by arcuate pie-shaped dispensing chambers received within the second chamber of the cylindrical sidewall of the body and can be rotatable with respect to the cylindrical sidewall of the body for aligning at least one the plurality of measuring compartments with the arcuate aperture of the body for allowing pourable material flow therethrough for measuring a predetermined measured amount of the pourable material within measuring compartments aligned in fluid communication therewith. The cylindrical sleeve member can include a non-measuring dispensing passage adjacent the plurality of measuring compartments. The non-measuring dispensing passage can be received within the second chamber of the cylindrical sidewall of the body and rotatable into fluid communication with the arcuate aperture of the radial panel of the body for dispensing a non-measured amount of pourable material. The cylindrical sleeve member can include a plurality of ridges formed on an internal surface engageable with respect to the plurality of grooves formed on the external surface of the cylindrical sidewall of the body for providing tactile feedback during rotation of the cylindrical sleeve member with respect to the cylindrical sidewall of the body. The biasing spring can bias the cylindrical sleeve member toward a predetermined home position with respect to the cylindrical sidewall of the body with the radial panel closing access to the plurality of measuring compartments during dispensing of the predetermined measured amount of the pourable material.

A cap can be assembled to be attached to a receptacle for receiving a pourable material. The method can include inserting a biasing spring between a portion of a body defining a primary axis and a portion of a cylindrical sleeve member for biasing the cylindrical sleeve member toward a predetermined rotational home position with respect to the cylindrical sidewall of the body. The body can have a first chamber and a second chamber longitudinally separated by a radial panel extending transversely with respect to the primary axis. The radial panel can define an arcuate aperture allowing passage of pourable material from the first chamber to the second chamber. The cylindrical sleeve member can be located coaxial with respect to the primary axis and can define a plurality of measuring compartments defined by arcuate pie-shaped dispensing chambers received within the second chamber of the cylindrical sidewall of the body. The cylindrical sleeve member can be rotatable with respect to the cylindrical sidewall of the body for aligning at least one the plurality of measuring compartments with the arcuate aperture of the body for allowing pourable material flow through the arcuate aperture for measuring a predetermined measured amount of pourable material within measuring compartments aligned in fluid communication with the arcuate aperture. The method can further include a sheathing an outer circumference of the cylindrical sidewall of the body with the cylindrical sleeve member with the biasing spring interposed therebetween, wherein the rotational home position locates the radial panel to close access to the plurality of measuring compartments during dispensing of the predetermined measured amount of the pourable material.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
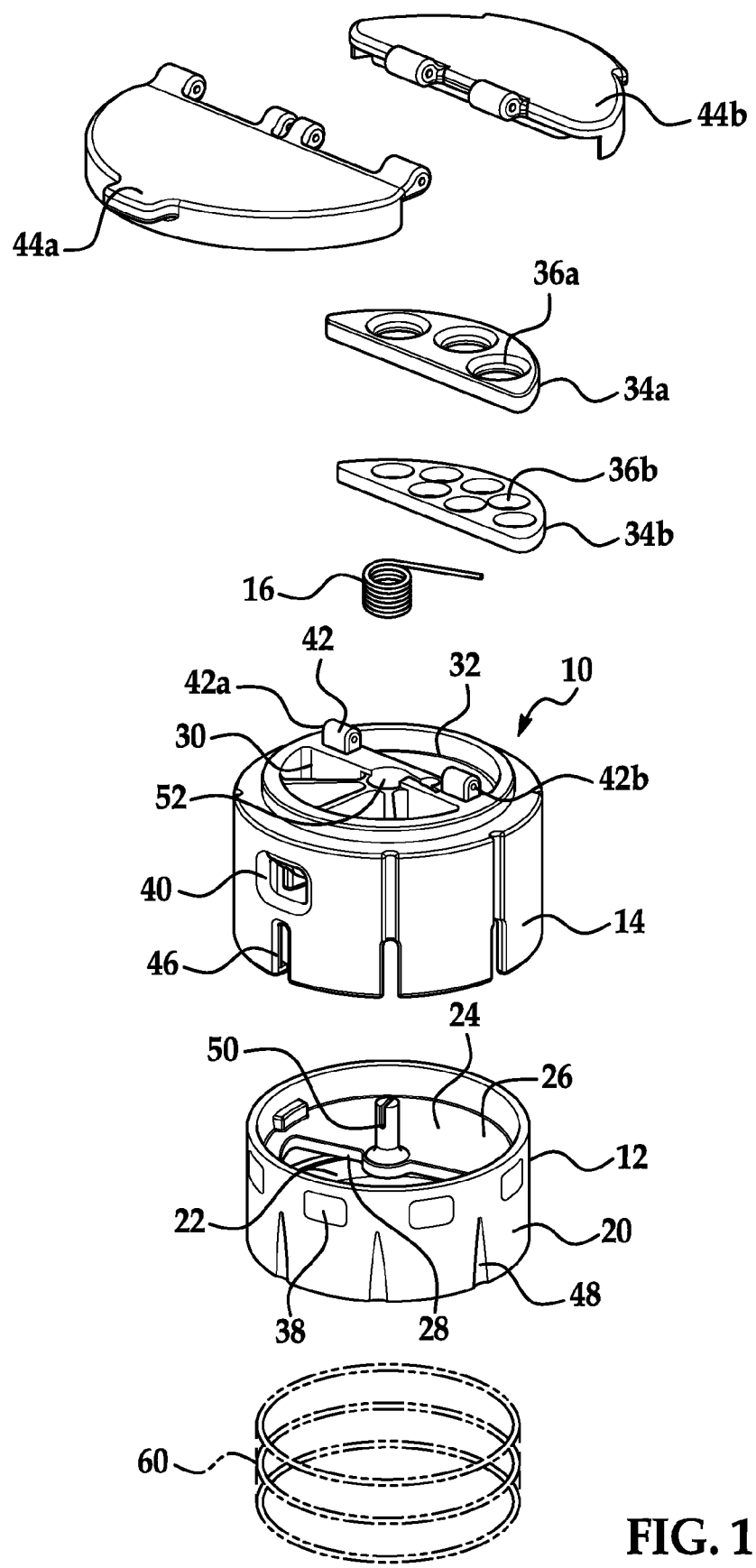
FIG. 1 is an exploded view of a removable cap in an apparatus for measuring and dispensing pourable material showing the cap having a body having a cylindrical sidewall defining a primary axis, a cylindrical sleeve member located coaxial with respect to the primary axis and sheathing an outer circumference of a cylindrical sidewall of the body, and a biasing spring engageable between a portion of the body and a portion of the sleeve member for biasing the cylindrical sleeve member toward a predetermined home position with respect to the cylindrical sidewall of the body.
Figure 2:
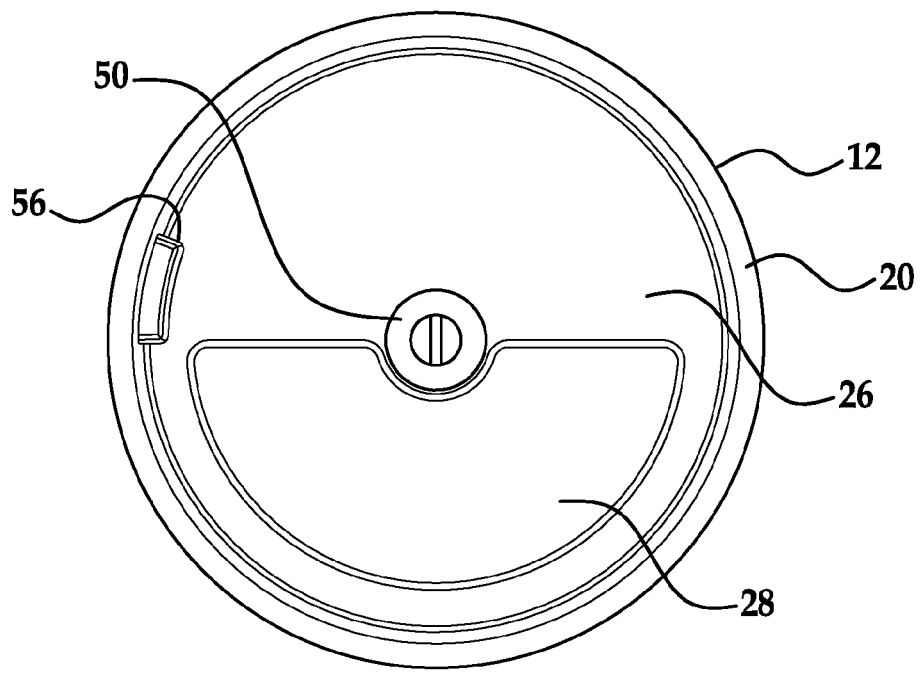
FIG. 2 is a top view of the body showing a radial panel defining an arcuate aperture allowing passage of the pourable material from a first chamber to a second chamber defined by the body.
Figure 3:
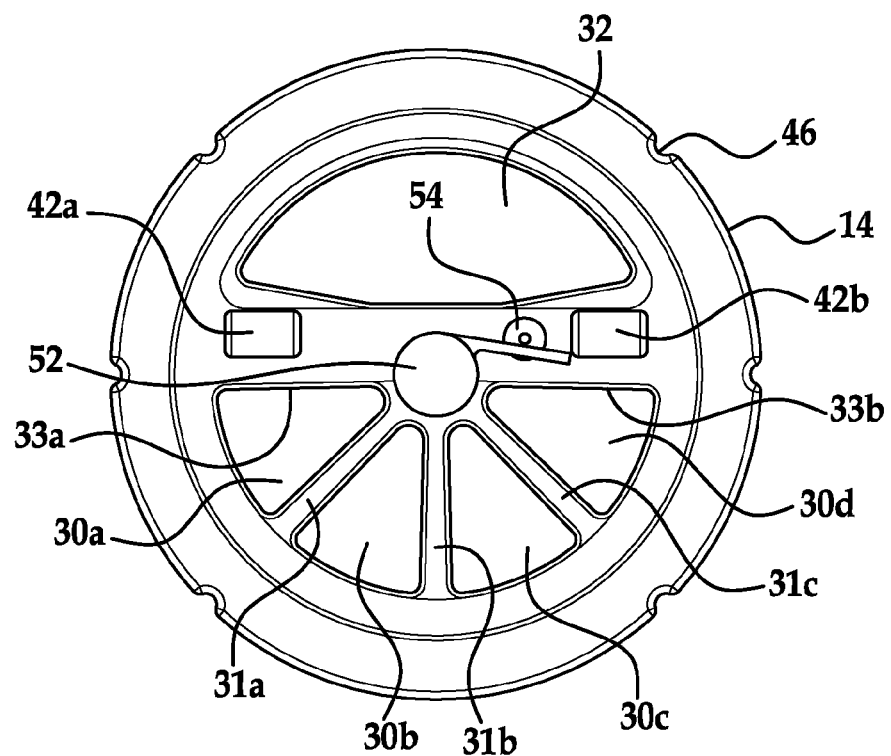
FIG. 3 is a top view of the cylindrical sleeve member showing the cylindrical sleeve member defining a plurality of measuring compartments defined by arcuate pie-shaped dispensing chambers, where the cylindrical sleeve member is rotatable with respect to the cylindrical sidewall of the body for aligning at least one of the plurality of measuring compartments with the arcuate aperture of the body for allowing pourable material flow therethrough.

Referring now to FIG. 1-3, there is shown a removable cap 10 for an apparatus for measuring and dispensing pourable material. The removable cap 10 can be secured to a receptacle 60 which can contain a pourable material. The cap 10 can include a body 12, a cylindrical sleeve member 14, and a biasing spring 16 engageable between the body 12 and the cylindrical sleeve member 14. The body 12 can include a cylindrical sidewall 20 defining a primary axis, a first chamber 22, and a second chamber 24 separated longitudinally from one another by a radial panel 26 extending transversely with respect to the primary axis. The radial panel 26 can define an arcuate aperture 28 allowing passage of the pourable material from the first chamber 22 to the second chamber 24. The cylindrical sleeve member 14 can be located coaxial with respect to the primary axis and can sheath an outer circumference of the cylindrical sidewall 20 of the body 12. The cylindrical sleeve member 14 can define a plurality of measuring compartments 30 defined by arcuate pie-shaped dispensing chambers 30a, 30b, 30c, 30d. The measuring compartments 30a, 30b, 30c, 30d can be received within the second chamber 24 of the cylindrical sidewall 20 of the body 12 when assembled. The cylindrical sleeve member 14 can be rotatable with respect to the cylindrical sidewall 20 of the body 12 for aligning at least one of the plurality of measuring compartments 30 with the arcuate aperture 28 of the body 12 for allowing pourable material flow therethrough for measuring a predetermined measured amount of the pourable material within measuring compartments 30a, 30b, 30c, 30d aligned in fluid communication therewith. The cylindrical sleeve member 14 can include a non-measuring dispensing passage 32 adjacent the plurality of measuring compartments 30a, 30b, 30c, 30d. The non-measuring dispensing passage 32 can be in fluid communication with the second chamber 24 of the cylindrical sidewall 20 of the body 12. The non-measuring dispensing passage 32 can be rotatable into fluid communication with the arcuate aperture 28 of the radial panel 26 of the body 12 for dispensing a non-measured amount of pourable material.

The biasing spring 16 can bias the cylindrical sleeve member 14 toward a predetermined home position with respect to the cylindrical sidewall 20 of the body 12 with the radial panel 26 closing access to the plurality of measuring compartments 30 during dispensing of the predetermined measured amount of the pourable material. The biasing spring 16 can be pre-loaded and can be formed of a suitable material by known methods of torsion spring manufacturing, by way of example and not limitation, such as stamping, bending, rolling, hot working, or cold forming material. The body 12 can include a fastener 50 connected to the radial panel 26 and located coaxial with respect to the primary axis and extending axially through the second chamber 24. The fastener 50 can support one end of the biasing spring 16. The second end of the biasing spring 16 can act against a surface 54 formed in the cylindrical sleeve member 14 spaced radially from the primary axis as best seen in FIG. 3. The cylindrical sleeve member 14 can define a central aperture 52 located coaxial with respect to the primary axis. The central aperture 52 can receive the fastener 50 and the biasing spring 16 allowing the biasing spring 16 to be engageable between the body 12 and the cylindrical sleeve member 14 for biasing the cylindrical sleeve member 14 toward the predetermined home position. By way of example and not limitation, the predetermined home position can be defined by the cylindrical sleeve member 14 rotated into a position where the non-measuring dispensing passage 32 is in fluid communication with the arcuate aperture 28 of the radial panel 26 of the body 12 for dispensing a non-measured amount of pourable material. The predetermined home position can be defined by the cylindrical sleeve member 14 rotated into a position where a first measuring compartment 30a is in fluid communication with the arcuate aperture 28 of the radial panel 26 of the body 12 for allowing pourable material flow therethrough for measuring a lowest predetermined measured amount of the pourable material. A stop 56 can be formed on the body 12 for engagement with a wall 33a, 33b of one of the measuring compartments 30a, 30d to limit rotational movement of the body 12 with respect to the sleeve member 14 to define the home position at a first angular end position and a maximum capacity measuring position a second angular end position.

The cylindrical sleeve member 14 can be rotated for measuring the pourable material and for dispensing the pourable material when the cap is in an inverted position. As illustrated in FIGS. 1 and 3, by way of example and not limitation, the plurality of measuring compartments 30a, 30b, 30c, 30d can include at least two of the plurality of measuring compartments 30a, 30b, 30c, 30d having an equal volume. As best illustrated in FIG. 3, each of the plurality of measuring compartments 30a, 30b, 30c, 30d can be separated by axial walls 31a, 31b, 31c defined by the cylindrical sleeve member 14. By way of example and not limitation, the plurality of measuring compartments 30a, 30b, 30c, 30d can include at least two of the plurality of measuring compartments 30a, 30b, 30c, 30d having a different volume.

As illustrated in FIG. 1, the cap 10 can further include a sprinkle panel 34a, 34b having a plurality of dispensing openings 36 in communication with the non-measuring dispensing passage 32 at least partially interfering with flow out of the non-measuring dispensing passage 32. The sprinkle panel 34a, 34b can be releasably connected to the cylindrical sleeve member 14 and can be removable if desired. The sprinkle panel 34a, 34b can include a first sprinkle panel 34a having a plurality of dispensing openings 36a and a second sprinkle panel 34b having a plurality of dispensing openings 36b. The plurality of dispensing openings 36a of the first sprinkle panel 34a can have a smaller diameter with respect to the plurality of dispensing openings 36b of the second sprinkle panel 34b. The first and second sprinkle panel 34a, 34b can be removable and interchangeable.

As illustrated in FIG. 1, the cylindrical sidewall 20 of the body 12 can include a plurality of measuring indicia 38 located on an outer surface of the cylindrical sidewall 20 of the body 12. Each of the plurality of measuring indicia 38 can correspond to at least one of the plurality of measuring compartments 30a, 30b, 30c, 30d located in fluid communication with the arcuate aperture 28 of the body 12. The cylindrical sleeve member 14 can include a window 40 defined therein such that the cylindrical sleeve member 14 can be rotatable with respect to the cylindrical sidewall 20 of the body 12 to display one of the plurality of measuring indicia 38 corresponding to a predetermined amount of pourable material to be measured within corresponding measuring compartments 30a, 30b, 30c, 30d aligned with the arcuate aperture 28 of the body 12. The cylindrical sleeve member 14 can include a hinge 42 formed at a dispensing end of the cylindrical sleeve member 14. The hinge 42 can be formed on the cylindrical sleeve member 14. The hinge 42 can include a first end 42a and a second end 42b. At least one flap member 44a, 44b can be connected to the hinge 42 for opening and closing the plurality of measuring compartments 30a, 30b, 30c, 30d. By way of example and not limitation an axial pin can extend between the first and second end 42a, 42b for supporting the at least one flap member 44a, 44b, or the hinge can be integrally formed with the at least one flap member 44a, 44b and the sleeve member 14 as a living hinge. The at least one flap member 44a, 44b can include a first flap member 44a and a second flap member 44b connected to the hinge 42. The first flap member 44a can be connected for opening and closing the plurality of measuring compartments 30a, 30b, 30c, 30d and the second flap member 44b can be connected for opening and closing the non-measuring dispensing passage 32.

The cylindrical sleeve member 14 can include a plurality of ridges 46 formed on an internal surface of the cylindrical sleeve member 14. The cylindrical sidewall 20 of the body 12 can include a plurality of grooves 48 engageable with respect to the plurality of ridges 46 formed on the internal surface of the cylindrical sleeve member 14. The plurality of ridges 46 can provide tactile feedback during rotation of the cylindrical sleeve member 14 with respect to the cylindrical sidewall 20 of the body 12. The plurality of ridges 46 can additionally temporarily prevent rotation of the cylindrical sleeve member 14 with respect to the cylindrical sidewall 20 by locking the cylindrical sleeve member 14 with respect to the cylindrical sidewall 20 in response to external pressure directed radially inward to allow allowing dispensing of the pourable material into at least one of the plurality of measuring compartments 30a, 30b, 30c, 30d. By way of example and not limitation, the body 12 and the cylindrical sleeve member 14 can be formed of an injection molded material.

Each of the plurality of measuring compartments 30a, 30b, 30c, 30d can be separated by an axial wall 31a, 31b, 31c, 31d formed in the cylindrical sleeve member 14.

A measuring and dispensing container can include a receptacle 60 for receiving an amount of pourable material. The container can include a body 12 having a cylindrical sidewall 20 with an end 21 attachable to the receptacle with any known attachment configuration, by way of example and not limitation, such as a snap fit or a threaded connection. The cylindrical sidewall of the body 12 can define a primary axis, a first chamber 22 and a second chamber 24 separated longitudinally from one another by a radial panel 26 extending transversely with respect to the primary axis. The radial panel 26 can define an arcuate aperture 28 allowing passage of the pourable material from the first chamber 22 to the second chamber 24. The body 12 can include a plurality of grooves 48 formed on an external surface of the cylindrical sidewall 20. The container can further include a cylindrical sleeve member 14 located coaxial with respect to the primary axis and sheathing an outer circumference of the cylindrical sidewall 20 of the body 12. The cylindrical sleeve member 14 can define a plurality of measuring compartments 30 defined by arcuate pie-shaped dispensing chambers 30a, 30b, 30c, 30d received within the second chamber 24 of the cylindrical sidewall 20 of the body 12. The cylindrical sleeve member 14 can be rotatable with respect to the cylindrical sidewall 20 of the body 12 for aligning at least one the plurality of measuring compartments 30a, 30b, 30c, 30d with the arcuate aperture 28 of the body 12 for allowing pourable material flow through the arcuate aperture 28 for measuring a predetermined measured amount of the pourable material within measuring compartments 30a, 30b, 30c, 30d aligned in fluid communication with the arcuate aperture 28. The cylindrical sleeve member 14 can include a non-measuring dispensing passage 32 adjacent the plurality of measuring compartments 30a, 30b, 30c, 30d. The non-measuring dispensing passage 32 can in fluid communication with the second chamber 24 of the cylindrical sidewall 20 of the body 12 and rotatable into fluid communication with the arcuate aperture 28 of the radial panel 26 of the body 12 for dispensing a non-measured amount of pourable material. The cylindrical sleeve member 14 can have a plurality of ridges 46 formed on an internal surface of the cylindrical sleeve member 14 engageable with respect to the plurality of grooves 48 formed on the external surface of the cylindrical sidewall 20 of the body 12. The plurality of ridges 46 and the plurality of grooves 48 can provide tactile feedback during rotation of the cylindrical sleeve member 14 with respect to the cylindrical sidewall 20 of the body 12. The measuring and dispensing container can further include a biasing spring 16 engageable between a portion of the body 12 and a portion of the sleeve member 14 for biasing the cylindrical sleeve member 14 toward a predetermined home position with respect to the cylindrical sidewall 20 of the body 12, where the radial panel 26 closes access to the plurality of measuring compartments 30a, 30b, 30c, 30d during dispensing of the predetermined measured amount of the pourable material when in the home position.

The measuring and dispensing container can include the cylindrical sleeve member 14 rotatable for measuring the pourable material and for dispensing the pourable material when the receptacle is in an inverted position. Each of the plurality of measuring compartments 30a, 30b, 30c, 30d can have an equal volume or a different volume adding up to a determined measurement of the pourable material. The measuring and dispensing container can include a sprinkle panel 34a, 34b having a plurality of dispensing openings 36a, 36b in communication with the non-measuring dispensing passage 32 at least partially interfering with flow out of the non-measuring dispensing passage 32. The sprinkle panel 34a, 34b can be releasably connected to the cylindrical sleeve member 14 and can be removable. The measuring and dispensing container can include a plurality of measuring indicia 38 located on an outer surface of the cylindrical sidewall 20 of the body 12. Each of the plurality of measuring indicia 38 can correspond to at least one of the plurality of measuring compartments 30a, 30b, 30c, 30d located in fluid communication with the arcuate aperture 28 of the body 12. The cylindrical sleeve member 14 can include a window 40 defined therein such that the cylindrical sleeve member 14 can be rotatable with respect to the cylindrical sidewall 20 of the body 12 to display one of the plurality of measuring indicia 38 corresponding to a predetermined amount of pourable material to be measured within corresponding measuring compartments 30a, 30b, 30c, 30d aligned with the arcuate aperture 28 of the body 12. The cylindrical sleeve member 14 can include a hinge 42 formed at a dispensing end of the cylindrical sleeve member 14. By way of example and not limitation, the hinge 42 can formed as a living hinge integral with the sleeve member 14 and at least one flap member 44a, 44b, or can include a first end 42a and a second end 42b for receiving a hinge pin (not shown) extending between the first and second ends 42a, 42b. At least one flap member 44a, 44b can be connected to the hinge 42 for opening and closing the plurality of measuring compartments 30a, 30b, 30c, 30d.

In operation, a user can rotate the cylindrical sleeve member 14 to a desired measured indicia 38 located on the cylindrical sidewall 20 of the body 12 corresponding to one of the plurality of measuring compartments 30a, 30b, 30c, 30d. A measuring and dispensing container including the cylindrical sleeve member 14 and the body 12 can be in an upright or inverted position. The corresponding measuring compartment 30a, 30b, 30c, 30d can be placed in fluid communication with the arcuate aperture 28 of the body 12 in response to the rotation by a user. The plurality of measuring compartments 30a, 30b, 30c, 30d can be accumulatively opened by rotation for increasing the predetermined measurement. More than one of the plurality of measuring compartments 30a, 30b, 30c, 30d can be in fluid communication with the arcuate aperture 28. A plurality of ridges 46 formed on an internal surface of the cylindrical sleeve member 14 can engage a plurality of grooves 48 formed on the cylindrical sidewall 20 of the body 12 providing tactile feedback during rotation of the cylindrical sleeve member 14. If the container having the cap is in the upright position, the container can be inverted for dispensing the pourable material. The cylindrical sleeve member 14 can be released by the user such that a pre-loaded biasing spring 16 can bias the cylindrical sleeve member 14 to rotate towards a predetermined home position prior to opening the flap for dispensing the measured amount of pourable material. When in the home position, additional pourable material is prevented from entering the measuring chambers thereby preventing the dispensing of an amount greater than the desired measured amount within the measuring compartments 30a, 30b, 30c, 30d.

Referring now to FIG. 3, by way of example and not limitation, the biasing spring 16 can bias the plurality of measuring compartments 30a, 30b, 30c, 30d in a counter-clockwise direction. The user can rotate the cylindrical sleeve member 14 in a clockwise direction up to 180°. By way of example and not limitation, the user can rotate the cylindrical sleeve member 14 in increments of approximately 45° to accumulatively open each of the plurality of measuring compartments 30a, 30b, 30c, 30d while holding the receptacle in an inverted position to fill the opened measuring compartments with pourable material. The cylindrical sleeve member 14 can then be biased to rotate in the counterclockwise direction to close access to the plurality of the measuring compartments 30a, 30b, 30c, 30d when released by the user. The user can then open the dispensing flap covering the measuring compartments to expose the measuring compartments and dispense the predetermined measured amount of the pourable material. In operation, the measuring and dispensing container can also be used in an inverted position when the cylindrical sleeve member 14 is in the predetermined home position to dispense a non-measured amount of the pourable material through a non-measuring dispensing passage 32 adjacent the plurality of measuring compartments 30a, 30b, 30c, 30d through the other of the plurality of flaps 44a, 44b. By way of example and not limitation, the user can apply pressure to the plurality of ridges 46 formed on the internal surface of the cylindrical sleeve member 14 when the plurality of ridges 46 are engaged with the plurality of grooves 48 formed on the cylindrical sidewall 20 of the body 12. The pressure applied can lock the cylindrical sleeve member 14 and the body 12 such that the at least one of the plurality of measuring compartments 30a, 30b, 30c, 30d can be held in fluid communication with the arcuate aperture 28 of the body 12 to ensure the at least one of the plurality of measuring compartments 30a, 30b, 30c, 30d is entirely filled with the pourable material and dispenses the entire amount of pourable material. When pressure is applied to the cylindrical sleeve member 14, i.e. the cylindrical sleeve 14 is squeezed by the user, the biasing spring 16 can be temporarily prevented from rotating the cylindrical sleeve member 14 toward the home position.

A cap 10 can be attached to a receptacle for receiving a pourable material. The cap 10 can be assembled by a method including inserting a biasing spring 16 between a portion of a body 12 defining a primary axis and a portion of a sleeve member 14 located coaxial with respect to the primary axis. The biasing spring 16 can be pre-loaded for biasing the cylindrical sleeve member 14 toward a predetermined rotational home position with respect to the cylindrical sidewall 20 of the body 12. The body 12 can have a first chamber 22 and a second chamber 24 longitudinally separated by a radial panel 26 extending transversely with respect to the primary axis. The radial panel 26 can define an arcuate aperture 28 allowing passage of pourable material from the first chamber 22 to the second chamber 24. The cylindrical sleeve member 16 can define a plurality of measuring compartments 30 defined by arcuate pie-shaped dispensing chambers 30a, 30b, 30c, 30d received within the second chamber 24 of the cylindrical sidewall of the body 12. The cylindrical sleeve member 14 can be rotatable with respect to the cylindrical sidewall 20 of the body 12 for aligning at least one of the plurality of measuring compartments 30a, 30b, 30c, 30d with the arcuate aperture 28 of the body 12 for allowing pourable material flow through the arcuate aperture 28 for measuring a predetermined measured amount of pourable material within measuring compartments 30a, 30b, 30c, 30d aligned in communication with the arcuate aperture 28 of the body 12. The method can further include sheathing an outer circumference of the cylindrical sidewall 20 of the body 12 with the cylindrical sleeve member 14 with the biasing spring 16 interposed between the body 12 and the cylindrical sleeve member 14 wherein the rotational home position locates the radial panel 26 to close access to the plurality of measuring compartments 30*a*, 30*b*, 30*c*, 30*d* during dispensing of the predetermined measured amount of the pourable material.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In an apparatus for measuring and dispensing pourable material having a removable cap, the improvement of the cap comprising:
    a body having a cylindrical sidewall defining a primary axis, a first chamber and a second chamber separated longitudinally from one another by a radial panel extending transversely with respect to the primary axis, the radial panel defining an arcuate aperture allowing passage of the pourable material from the first chamber to the second chamber;
    a cylindrical sleeve member located coaxial with respect to the primary axis and sheathing an outer circumference of the cylindrical sidewall of the body, the cylindrical sleeve member defining a plurality of measuring compartments defined by dispensing chambers received within the second chamber of the cylindrical sidewall of the body, the cylindrical sleeve member rotatable with respect to the cylindrical sidewall of the body for aligning at least one of the plurality of measuring compartments with the arcuate aperture of the body for allowing pourable material flow therethrough for measuring a predetermined measured amount of the pourable material within measuring compartments aligned in fluid communication therewith; and
    a biasing spring engageable between the body and the sleeve member for biasing the sleeve member toward a predetermined home position with respect to the body with the radial panel closing access to the plurality of measuring compartments during dispensing of the predetermined measured amount of the pourable material.

2. The improvement of claim 1, wherein the cylindrical sleeve member can be rotated for measuring the pourable material and for dispensing the pourable material when the cap is in an inverted position.

3. The improvement of claim 1, wherein at least two of the plurality of measuring compartments has an equal volume.

4. The improvement of claim 1, wherein at least two of the plurality of measuring compartments has a different volume.

5. The improvement of claim 1, wherein the cylindrical sleeve member includes a non-measuring dispensing passage adjacent the plurality of measuring compartments, the non-measuring dispensing passage received within the second chamber of the cylindrical sidewall of the body and rotatable into fluid communication with the arcuate aperture of the radial panel of the body for dispensing a non-measured amount of pourable material.

6. The improvement of claim 5 further comprising:
    a sprinkle panel having a plurality of dispensing openings in communication with the non-measuring dispensing passage at least partially interfering with flow out of the non-measuring dispensing passage.

7. The improvement of claim 6, wherein the sprinkle panel is releasibly connected to the cylindrical sleeve member and is removable.

8. The improvement of claim 1 further comprising:
    a plurality of measuring indicia located on an outer surface of the cylindrical sidewall of the body, each of the plurality of measuring indicia corresponding to at least one of the plurality of measuring compartments located in fluid communication with the arcuate aperture of the body; and
    the cylindrical sleeve member having a window defined therein, the cylindrical sleeve member rotatable with respect to the cylindrical sidewall of the body to display one of the plurality of measuring indicia corresponding to a predetermined amount of pourable material to be measured within corresponding measuring compartments aligned with the arcuate aperture of the body.

9. The improvement of claim 1 further comprising:
    a hinge formed at a dispensing end of the cylindrical sleeve member and having a first end and a second end; and
    at least one flap member connected to the hinge for opening and closing the plurality of measuring compartments.

10. The improvement of claim 1 further comprising:
    a plurality of ridges formed on an internal surface of the cylindrical sleeve member; and
    the cylindrical sidewall of the body including a plurality of grooves engageable with respect to the plurality of ridges formed on the internal surface of the cylindrical sleeve member for providing tactile feedback during rotation of the cylindrical sleeve member with respect to the cylindrical sidewall of the body and for temporarily preventing rotation of the cylindrical sleeve member with respect to the cylindrical sidewall by locking the cylindrical sleeve member with respect to the cylindrical sidewall in response to external pressure directed radially inward to allow dispensing of the pourable material into at least one of the plurality of measuring compartments.

11. A measuring and dispensing container comprising:
    a receptacle for receiving an amount of pourable material;
    a body having a cylindrical sidewall with an end attachable to the receptacle, the cylindrical sidewall of the body defining a primary axis, a first chamber and a second chamber separated longitudinally from one another by a radial panel extending transversely with respect to the primary axis, the radial panel defining an arcuate aperture allowing passage of the pourable material from the first chamber to the second chamber, the body including a plurality of grooves formed on an external surface of the cylindrical sidewall;
    a cylindrical sleeve member located coaxial with respect to the primary axis and sheathing an outer circumference of the cylindrical sidewall of the body, the cylindrical sleeve member defining a plurality of measuring compartments defined by arcuate pie-shaped dispensing chambers received within the second chamber of the cylindrical sidewall of the body, the cylindrical sleeve member rotatable with respect to the cylindrical sidewall of the body for aligning at least one of the plurality of measuring compartments with the arcuate aperture of the body for allowing pourable material flow therethrough for measuring a predetermined measured amount of the pourable material within measuring compartments aligned in fluid communication therewith, the cylindrical sleeve member including a non-measuring dispensing passage adjacent the plurality of measuring compartments, the non-measuring dispensing passage in fluid communication with the second chamber of the cylindrical sidewall of the body and rotatable into fluid communication with the arcuate aperture of the radial panel of the body for dispensing a non-measured amount of pourable material, the cylindrical sleeve member having a plurality of ridges formed on an internal surface engageable with respect to the plurality of grooves formed on the external surface of the cylindrical sidewall of the body for providing tactile feedback during rotation of the cylindrical sleeve member with respect to the cylindrical sidewall of the body; and a biasing spring engageable between the body and the sleeve member for biasing the cylindrical sleeve member toward a predetermined home position with respect to the cylindrical sidewall of the body with the radial panel closing access to the plurality of measuring compartments during dispensing of the predetermined measured amount of the pourable material.

12. The measuring and dispensing container of claim 11, wherein the cylindrical sleeve member can be rotated for measuring the pourable material and for dispensing the pourable material when the receptacle is in an inverted position.

13. The measuring and dispensing container of claim 11, wherein each of the plurality of measuring compartments has an equal volume.

14. The measuring and dispensing container of claim 11, wherein each of the plurality of measuring compartments has a different volume.

15. The measuring and dispensing container of claim 11 further comprising:
a sprinkle panel having a plurality of dispensing openings in communication with the non-measuring dispensing passage at least partially interfering with flow out of the non-measuring dispensing passage.

16. The measuring and dispensing container of claim 15, wherein the sprinkle panel is releasibly connected to the cylindrical sleeve member and is removable.

17. The measuring and dispensing container of claim 11 further comprising:
a plurality of measuring indicia located on an outer surface of the cylindrical sidewall of the body, each of the plurality of measuring indicia corresponding to at least one of the plurality of measuring compartments located in fluid communication with the arcuate aperture of the body; and
the cylindrical sleeve member having a window defined therein, the cylindrical sleeve member rotatable with respect to the cylindrical sidewall of the body to display one of the plurality of measuring indicia corresponding to a predetermined amount of pourable material to be measured within corresponding measuring compartments aligned with the arcuate aperture of the body.

18. The measuring and dispensing container of claim 11 further comprising:
a hinge formed at a dispensing end of the cylindrical sleeve member and having a first end and a second end; and
at least one flap member connected to the hinge for opening and closing the plurality of measuring compartments.

19. A method for assembling a cap to be attached to a receptacle for receiving a pourable material, the method comprising:
inserting a biasing spring between a body having a cylindrical sidewall defining a primary axis and a cylindrical sleeve member for biasing the cylindrical sleeve member toward a predetermined rotational home position with respect to the cylindrical sidewall of the body, the body having a first chamber and a second chamber longitudinally separated by a radial panel extending transversely with respect to the primary axis, the radial panel defining an arcuate aperture allowing passage of pourable material from the first chamber to the second chamber, the cylindrical sleeve member located coaxial with respect to the primary axis, the cylindrical sleeve member defining a plurality of measuring compartments defined by dispensing chambers received within the second chamber of the cylindrical sidewall of the body, the cylindrical sleeve member rotatable with respect to the cylindrical sidewall of the body for aligning at least one of the plurality of measuring compartments with the arcuate aperture of the body for allowing pourable material flow therethrough for measuring a predetermined measured amount of pourable material within measuring compartments aligned in fluid communication therewith; and
sheathing an outer circumference of the cylindrical sidewall of the body with the cylindrical sleeve member with the biasing spring interposed between the body and the cylindrical sleeve member, wherein the rotational home position locates the radial panel to close access to the plurality of measuring compartments during dispensing of the predetermined measured amount of the pourable material.

* * * * *